(12) United States Patent
Witkowski et al.

(10) Patent No.: US 11,024,192 B2
(45) Date of Patent: Jun. 1, 2021

(54) VEHICLE TRAINABLE TRANSCEIVER FOR ALLOWING CLOUD-BASED TRANSFER OF DATA BETWEEN VEHICLES

(71) Applicant: Gentex Corporation, Zeeland, MI (US)

(72) Inventors: Todd R. Witkowski, Zeeland, MI (US); Thomas D. Klaver, Ada, MI (US); Jonathan E. Dorst, Holland, MI (US); Steven L. Geerlings, Holland, MI (US); Thomas S. Wright, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/616,067

(22) Filed: Jun. 7, 2017

(65) Prior Publication Data

US 2017/0352286 A1 Dec. 7, 2017

Related U.S. Application Data

(60) Provisional application No. 62/346,662, filed on Jun. 7, 2016.

(51) Int. Cl.
*G09B 9/05* (2006.01)
*H04B 1/40* (2015.01)
(Continued)

(52) U.S. Cl.
CPC .............. *G09B 9/05* (2013.01); *G06F 3/038* (2013.01); *G08C 19/16* (2013.01); *H04B 1/3827* (2013.01); *H04B 1/40* (2013.01); *G08C 19/28* (2013.01)

(58) Field of Classification Search
None
See application file for complete search history.

(56) References Cited

U.S. PATENT DOCUMENTS 5,442,340 A * 8/1995 Dykema ................. B60R 1/088
340/5.25
5,479,155 A * 12/1995 Zeinstra ................. B60R 1/088
340/12.28

(Continued)

FOREIGN PATENT DOCUMENTS

KR 20150137941 A * 12/2015
RU 2214065 10/2003

(Continued)

OTHER PUBLICATIONS

Bluetooth SIG, Internet Protocol Support Profile, Bluetooth Specification V 1.0, Dec. 2014 (Year: 2014).*

*Primary Examiner* — Berhanu Tadese
(74) *Attorney, Agent, or Firm* — Price Heneveld LLP; Bradley D. Johnson (57) ABSTRACT

A trainable transceiver is provided for a vehicle for transmitting signals to a device remote from the vehicle. The trainable transceiver includes an RF transceiver configured to receive an RF signal during a training mode in order to learn characteristics of the received RF signal, and to transmit an RF signal to the remote device in an operating mode where the transmitted RF signal includes the learned characteristics of the received RF signal; a local memory device for storing channel data representing the learned characteristics of the received RF signal; an interface configured to communicate with an Internet-connected device; and a controller coupled to the local memory device and the interface, the controller configured to retrieve the channel data from the local memory device and transfer the channel data for storage remote from the vehicle using the interface. The controller may also receive channel data from the remote memory device.

31 Claims, 3 Drawing Sheets

(51) Int. Cl.
*G06F 3/038* (2013.01)
*G08C 19/16* (2006.01)
*H04B 1/3827* (2015.01)
*G08C 19/28* (2006.01)

(56) References Cited

U.S. PATENT DOCUMENTS

| | | | | |
|---|---|---|---|---|
| 5,583,485 | A * | 12/1996 | Van Lente | B60R 1/04 340/12.28 |
| 5,614,891 | A * | 3/1997 | Zeinstra | B60R 1/088 340/12.24 |
| 5,619,190 | A * | 4/1997 | Duckworth | B60R 1/088 340/5.25 |
| 5,627,529 | A | 5/1997 | Duckworth et al. | |
| 5,646,701 | A | 7/1997 | Duckworth et al. | |
| 5,661,651 | A * | 8/1997 | Geschke | B60C 23/0408 701/88 |
| 5,661,804 | A * | 8/1997 | Dykema | G07C 9/00182 380/262 |
| 5,686,903 | A * | 11/1997 | Duckworth | G08C 17/02 340/13.24 |
| 5,699,054 | A * | 12/1997 | Duckworth | G08C 17/02 340/13.24 |
| 5,699,055 | A * | 12/1997 | Dykema | G08C 17/02 340/13.24 |
| 5,793,300 | A * | 8/1998 | Suman | G07C 9/00182 340/12.29 |
| 5,854,593 | A * | 12/1998 | Dykema | G07C 9/00182 340/12.23 |
| 5,903,226 | A | 5/1999 | Suman et al. | |
| 5,940,000 | A * | 8/1999 | Dykema | B60R 25/24 340/4.31 |
| 6,028,537 | A * | 2/2000 | Suman | B60K 35/00 340/988 |
| 6,091,343 | A * | 7/2000 | Dykema | G07C 9/00857 340/13.21 |
| 6,965,757 | B2 * | 11/2005 | Eray | H04B 1/28 340/12.5 |
| 6,970,082 | B2 * | 11/2005 | Reese | G08B 25/008 340/5.3 |
| 6,978,126 | B1 * | 12/2005 | Blaker | G07C 9/00309 340/4.3 |
| 7,197,278 | B2 | 3/2007 | Harwood et al. | |
| 7,266,204 | B2 * | 9/2007 | Watson | B60R 1/12 381/86 |
| 7,346,374 | B2 * | 3/2008 | Witkowski | G07C 5/008 455/569.2 |
| 7,469,129 | B2 | 12/2008 | Blaker et al. | |
| 7,532,965 | B2 | 5/2009 | Robillard et al. | |
| 7,778,604 | B2 | 8/2010 | Bauman et al. | |
| 7,786,843 | B2 * | 8/2010 | Witkowski | G08C 19/28 340/5.25 |
| 7,864,070 | B2 * | 1/2011 | Witkowski | G08C 19/28 340/12.24 |
| 7,889,050 | B2 * | 2/2011 | Witkowski | B60R 25/24 340/5.22 |
| 7,911,358 | B2 * | 3/2011 | Bos | G08C 17/02 340/4.3 |
| 7,970,446 | B2 * | 6/2011 | Witkowski | H04B 7/2609 455/575.9 |
| 8,000,667 | B2 | 8/2011 | Witkowski et al. | |
| 8,049,595 | B2 * | 11/2011 | Olson | G08C 17/02 340/5.61 |
| 8,165,527 | B2 * | 4/2012 | Sims | G08C 19/28 455/41.3 |
| 8,174,357 | B2 * | 5/2012 | Geerlings | G08C 19/28 340/5.64 |
| 8,208,888 | B2 * | 6/2012 | Chutorash | G07C 9/00309 455/352 |
| 8,253,528 | B2 * | 8/2012 | Blaker | B60R 25/24 340/5.22 |
| 8,264,333 | B2 * | 9/2012 | Blaker | G08C 17/02 340/12.22 |
| 8,384,580 | B2 * | 2/2013 | Witkowski | G08C 17/02 341/176 |
| 8,494,449 | B2 * | 7/2013 | Witkowski | H04B 7/2609 455/41.3 |
| 8,531,266 | B2 * | 9/2013 | Shearer | G08C 23/04 340/3.9 |
| 8,634,888 | B2 * | 1/2014 | Witkowski | H04L 67/14 455/575.9 |
| 8,643,467 | B2 * | 2/2014 | Chutorash | E05F 15/72 340/5.71 |
| 8,643,481 | B2 | 2/2014 | Campbell et al. | |
| 8,760,267 | B2 | 6/2014 | Bos et al. | |
| 8,837,608 | B2 * | 9/2014 | Witkowski | H04B 7/0689 375/259 |
| 8,981,898 | B2 * | 3/2015 | Sims | G08C 17/02 340/5.71 |
| 9,324,230 | B2 * | 4/2016 | Chutorash | G08C 17/02 |
| 9,552,723 | B2 * | 1/2017 | Witkowski | G08C 19/28 |
| 9,587,958 | B2 * | 3/2017 | Campbell | G01C 21/3688 |
| 9,620,005 | B2 * | 4/2017 | Geerlings | G07C 9/00571 |
| 9,652,907 | B2 * | 5/2017 | Geerlings | G07C 9/00 |
| 9,652,978 | B2 * | 5/2017 | Wright | H04B 1/3822 |
| 9,679,471 | B2 * | 6/2017 | Geerlings | G08C 17/02 |
| 9,691,271 | B2 * | 6/2017 | Geerlings | G07C 9/00309 |
| 9,805,589 | B2 * | 10/2017 | Geerlings | G08C 17/02 |
| 9,858,806 | B2 * | 1/2018 | Geerlings | H04W 4/02 |
| 9,875,650 | B2 * | 1/2018 | Witkowski | G08C 17/02 |
| 2002/0044065 | A1 | 4/2002 | Quist et al. | |
| 2002/0190872 | A1 * | 12/2002 | Suman | G08C 17/02 340/12.22 |
| 2003/0222820 | A1 * | 12/2003 | Karr | G01S 1/026 342/457 |
| 2004/0048622 | A1 * | 3/2004 | Witkowski | G08C 17/02 455/456.6 |
| 2004/0110472 | A1 * | 6/2004 | Witkowski | H04L 12/66 455/41.2 |
| 2005/0026605 | A1 * | 2/2005 | Guthrie | G07C 9/00182 455/420 |
| 2005/0046545 | A1 * | 3/2005 | Skekloff | G08C 23/04 340/5.61 |
| 2006/0126197 | A1 * | 6/2006 | Drummond | B60R 1/088 359/884 |
| 2007/0060079 | A1 * | 3/2007 | Nakagawa | G01S 5/06 455/131 |
| 2007/0167138 | A1 * | 7/2007 | Bauman | H04L 12/2803 455/41.2 |
| 2008/0062000 | A1 | 3/2008 | Styers et al. | |
| 2009/0021348 | A1 * | 1/2009 | Farris | G07C 9/00182 340/5.71 |
| 2009/0315751 | A1 | 12/2009 | Bennie et al. | |
| 2010/0097239 | A1 * | 4/2010 | Campbell | B60R 11/0252 340/4.4 |
| 2010/0134240 | A1 * | 6/2010 | Sims | G08C 17/02 340/5.1 |
| 2010/0171588 | A1 | 7/2010 | Chutorash et al. | |
| 2010/0210220 | A1 * | 8/2010 | Chutorash | G07C 9/00817 455/68 |
| 2010/0240307 | A1 * | 9/2010 | Sims | G08C 19/28 455/41.3 |
| 2011/0018694 | A1 * | 1/2011 | Geerlings | G08C 17/02 340/12.28 |
| 2011/0025456 | A1 | 2/2011 | Bos et al. | |
| 2011/0112969 | A1 | 5/2011 | Zaid et al. | |
| 2011/0248866 | A1 | 10/2011 | Chutorash et al. | |
| 2012/0126942 | A1 * | 5/2012 | Geerlings | G08C 17/02 340/5.61 |
| 2013/0142269 | A1 * | 6/2013 | Witkowski | H04B 7/0689 375/259 |
| 2013/0147616 | A1 | 6/2013 | Lambert et al. | |
| 2013/0151977 | A1 | 6/2013 | Arteaga-King et al. | |
| 2014/0009263 | A1 | 1/2014 | Shearer et al. | |
| 2014/0111315 | A1 | 4/2014 | Geerlings et al. | |
| 2014/0118119 | A1 | 5/2014 | Geerlings et al. | |
| 2015/0137941 | A1 * | 5/2015 | Bauer | G07C 9/20 340/5.61 |
| 2015/0302730 | A1 * | 10/2015 | Geerlings | G07C 9/20 340/5.25 |

(56) References Cited

U.S. PATENT DOCUMENTS

| | | | | |
|---|---|---|---|---|
| 2015/0302731 A1* | 10/2015 | Geerlings | .......... | G07C 9/00571 340/5.24 |
| 2015/0302734 A1* | 10/2015 | Geerlings | .......... | G07C 9/00309 340/5.25 |
| 2015/0302738 A1* | 10/2015 | Geerlings | .......... | G07C 9/00571 340/5.25 |
| 2015/0325113 A1* | 11/2015 | Geerlings | .............. | G08C 23/04 340/5.25 |
| 2016/0267782 A1* | 9/2016 | Shearer | .................. | G08C 17/02 |
| 2017/0294065 A1* | 10/2017 | Geerlings | ................ | G07C 9/20 |
| 2017/0352286 A1* | 12/2017 | Witkowski | .............. | G06F 3/038 |
| 2019/0209022 A1* | 7/2019 | Sobol | ................ | G08B 21/0288 |

FOREIGN PATENT DOCUMENTS

| | | | | |
|---|---|---|---|---|
| RU | 2402074 | 10/2010 | | |
| WO | WO 2004077729 A2 * | 9/2004 | ............ | B60R 25/24 |
| WO | WO-2004077729 A2 * | 9/2004 | ............ | B60R 25/24 |
| WO | 2008079811 | 7/2008 | | |
| WO | WO-2017214255 A1 * | 12/2017 | ............... | G09B 9/05 |

* cited by examiner

VEHICLE TRAINABLE TRANSCEIVER FOR ALLOWING CLOUD-BASED TRANSFER OF DATA BETWEEN VEHICLES

CROSS-REFERENCE TO RELATED APPLICATION

This application claims priority to and the benefit under 35 U.S.C. § 119(e) of U.S. Provisional Patent Application No. 62/346,662, filed on Jun. 7, 2016, entitled "VEHICLE TRAINABLE TRANSCEIVER FOR ALLOWING CLOUD-BASED TRANSFER OF DATA BETWEEN VEHICLES," by Todd R. Witkowski et al., the entire disclosure of which is incorporated herein by reference.

FIELD OF THE INVENTION

The present invention generally relates to trainable transceivers for vehicles, and more particularly, trainable transceivers for transmitting radio frequency (RF) signals to a device remote from the vehicle.

SUMMARY OF THE INVENTION

According to one aspect of the present invention, a trainable transceiver is provided for transmitting signals to a remote device. The trainable transceiver comprises: an RF transceiver configured to receive an RF signal during a training mode in order to learn characteristics of the received RF signal, and to transmit an RF signal to the remote device in an operating mode where the transmitted RF signal includes the learned characteristics of the received RF signal; a local memory device for storing channel data representing the learned characteristics of the received RF signal; an interface configured to communicate with an Internet-connected device; and a controller coupled to the local memory device and the interface, the controller configured to retrieve the channel data from the local memory device and to transfer the channel data for remote storage using the interface.

According to another embodiment of the present invention, a trainable transceiver is provided for transmitting signals to a remote device. The trainable transceiver comprises: a local memory device; an interface configured to communicate with an Internet-connected device capable of storing channel data in a remote memory device, the channel data representing characteristics of an RF signal; a controller coupled to the local memory device and the interface, the controller configured to receive channel data from the remote memory device using the interface and to store the received channel data in the local memory device; and an RF transceiver configured to transmit the RF signal to the remote device in an operating mode where the transmitted RF signal includes the characteristics stored as channel data in the local memory device.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

As noted above, the embodiments described below pertain to a trainable transceiver. Vehicle-installed trainable RF transceivers are known that are capable of learning characteristics of an RF signal transmitted by an original portable garage door opener transmitter that typically comes with a garage door opener (GDO). Once the trainable RF transceiver learns the characteristics, it may then transmit an RF signal having the characteristics to the GDO, which responds to the RF signal in the same manner as if transmitted from the original portable GDO transmitter. Examples of such known trainable RF transceivers are disclosed in commonly-assigned U.S. Pat. Nos. 5,442,340; 5,479,155; 5,583,485; 5,614,891; 5,619,190; 5,627,529; 5,646,701; 5,661,804; 5,686,903; 5,699,054; 5,699,055; 5,793,300; 5,854,593; 5,903,226; 5,940,000; 6,091,343; 6,965,757; 6,978,126; 7,469,129; 7,786,843; 7,864,070; 7,889,050; 7,911,358; 7,970,446; 8,000,667; 8,049,595; 8,165,527; 8,174,357; 8,531,266; 8,494,449; 8,384,580; 8,264,333; and 8,253,528, the entire disclosures of which are incorporated herein by reference. The trainable RF transceivers disclosed in these patents are sold commercially as HomeLink® trainable RF transceivers available from Gentex Corporation of Zeeland, Mich. Such trainable RF transceivers are capable of learning characteristics of the RF signal that include not only the RF carrier frequency, data code and modulation, but also any characteristics needed to learn and generate a rolling code. See the above-identified U.S. Pat. No. 5,661,804, for example. One recent trainable transceiver is further capable of communicating with remote devices including a GDO over the Internet. An example of such a trainable transceiver is disclosed in commonly-assigned United States Patent Application Publication No. 2015/0137941 A1, the entire disclosure of which is incorporated herein by reference.

To train the prior trainable transceivers, a user would typically press and hold one of the interface buttons until an indicator light would flash. At that time they would activate the original portable GDO transmitter such that the trainable transceiver would receive the RF signal transmitted from the GDO transmitter. If training was successful, the indicator light would flash at a different rate. Depending on the make and model of the GDO, however, other steps may be required such as pressing a button on the GDO itself. If training was not successful, the user would have to repeat the process. Further, for each additional remote device to be controlled by the trainable transceiver, an additional "channel" would need to be trained for each RF signal to be transmitted to the additional remote device(s). Moreover, if a vehicle owner were to either buy a new vehicle or drive a loaner vehicle while the owner's vehicle is being repaired, the user may repeat the training for some or all channels in the new or loaner vehicle. Further, if the vehicle owner owned two vehicles, the user would train each channel of the trainable transceiver in each vehicle.

Figure 1:
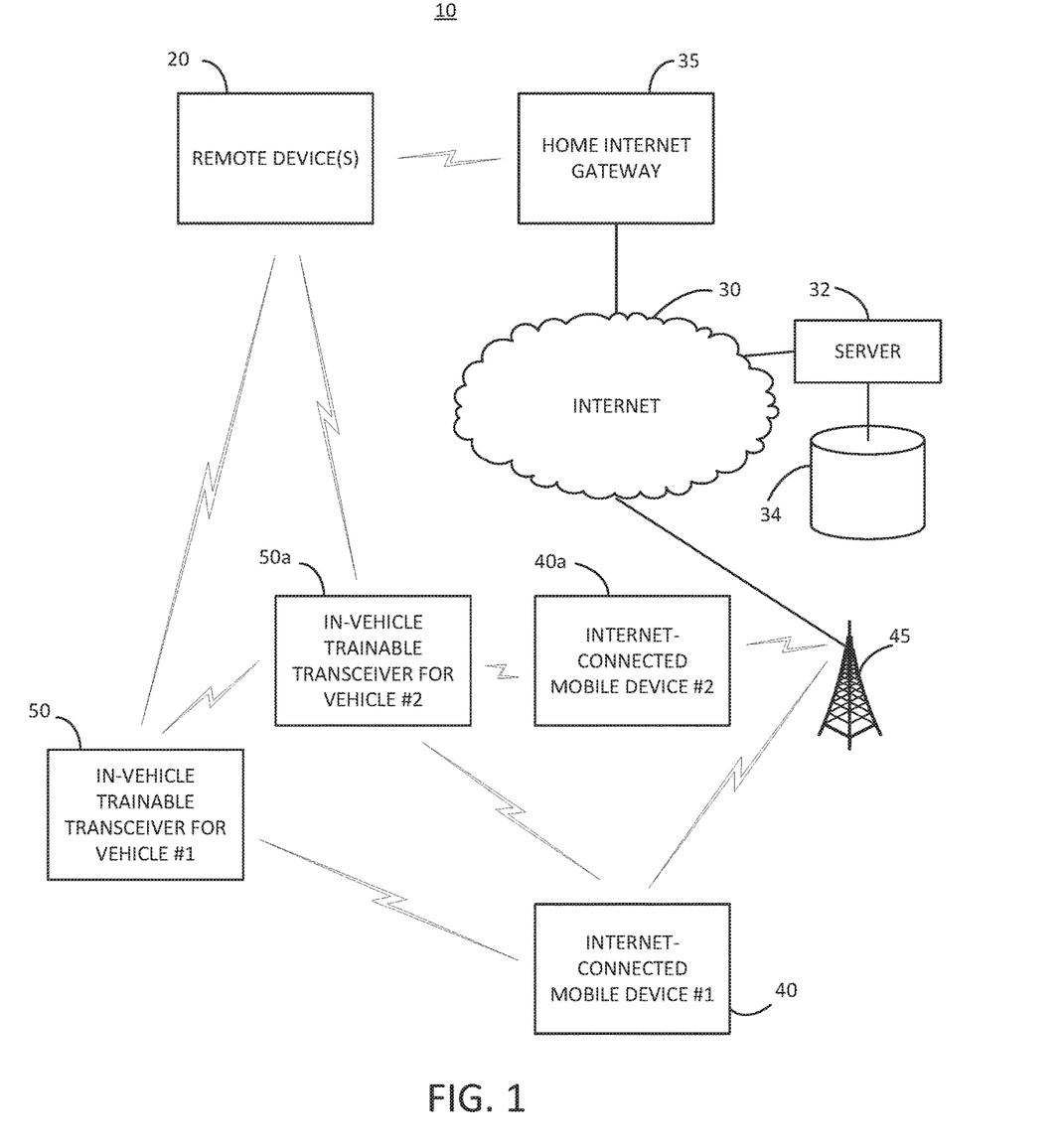
FIG. 1 is a block diagram showing an environment in which one or more transceiver systems may be operated.

FIG. 1 shows an example of an environment 10 in which one or more vehicles having trainable transceivers 50 and 50a, respectively, may operate. Environment 10 includes one or more remote devices 20 that may include, for example, garage door openers, security gates, security systems, lights, thermostats, door locks, and appliances. Such remote devices 20 may be accessed through the Internet 30 through a home Internet gateway 35 that is connected via conventional means to the Internet 30. Remote device(s) 20 may connect to home Internet gateway 35 via Bluetooth®, Bluetooth® Low Energy, Wi-Fi, wired Ethernet or a special purpose wireless RF link.

A trainable transceiver 50 installed in a vehicle may communicate directly with remote device 20 by sending an RF signal directly to remote device 20. The remote device(s) 20 can be remotely controlled via the Internet 30 using an Internet-connected mobile device 40, such as a smartphone or in-vehicle Internet connection, for example. The Internet-connected mobile device 40 connects to the Internet 30 through a cellular telephone tower 45 or through other known means such as Wi-Fi. A user interface 70 (FIG. 2) may be installed in the vehicle in association with trainable transceiver 50 that communicates with Internet-connected mobile device 40 to cause Internet-connected mobile device 40 to control remote device 20.

A second trainable transceiver 50a installed in another vehicle may also communicate directly with remote device 20 by sending an RF signal directly to remote device 20. A second Internet-connected mobile device 40a may be provided in association with second trainable transceiver 50a. Alternatively or additionally, second trainable transceiver 50a may communicate with Internet-connected mobile device 40.

An Internet data server 32 may be provided to manage a remote memory device 34 in order to provide cloud storage of channel data (i.e., characteristics of RF signals) that may be used to control remote device(s) 20. As described further below, trainable transceiver 50 or 50a may transfer channel data representing learned RF signal characteristics to server 32 for storage in remote memory device 34 using Internet-connected device 40 or 40a. Further, trainable transceiver 50 or 50a may retrieve channel data representing learned RF signal characteristics from storage in remote memory device 34 using Internet-connected device 40 or 40a. In this manner, once RF signal characteristics have been learned by any one trainable transceiver 50 or 50a and stored in a local memory device 65 (FIG. 2) of the vehicle as channel data, the channel data may be stored in remote storage device 34 for subsequent retrieval by another trainable transceiver 50a or 50 of another vehicle. Thus, the channel data may be effectively transferred from one vehicle to another without requiring the time-consuming training steps of the other trainable transceiver.

The home Internet gateway 35 may serve as a gateway for the Internet-connected device 40 or the trainable transceiver 50 to communicate with other remote devices 20 within a home or other building. Gateway 35 may communicate with these other devices using a variety of communication protocols, such as Bluetooth mesh networking, ZigBee, and/or Z-wave.

Figure 2:
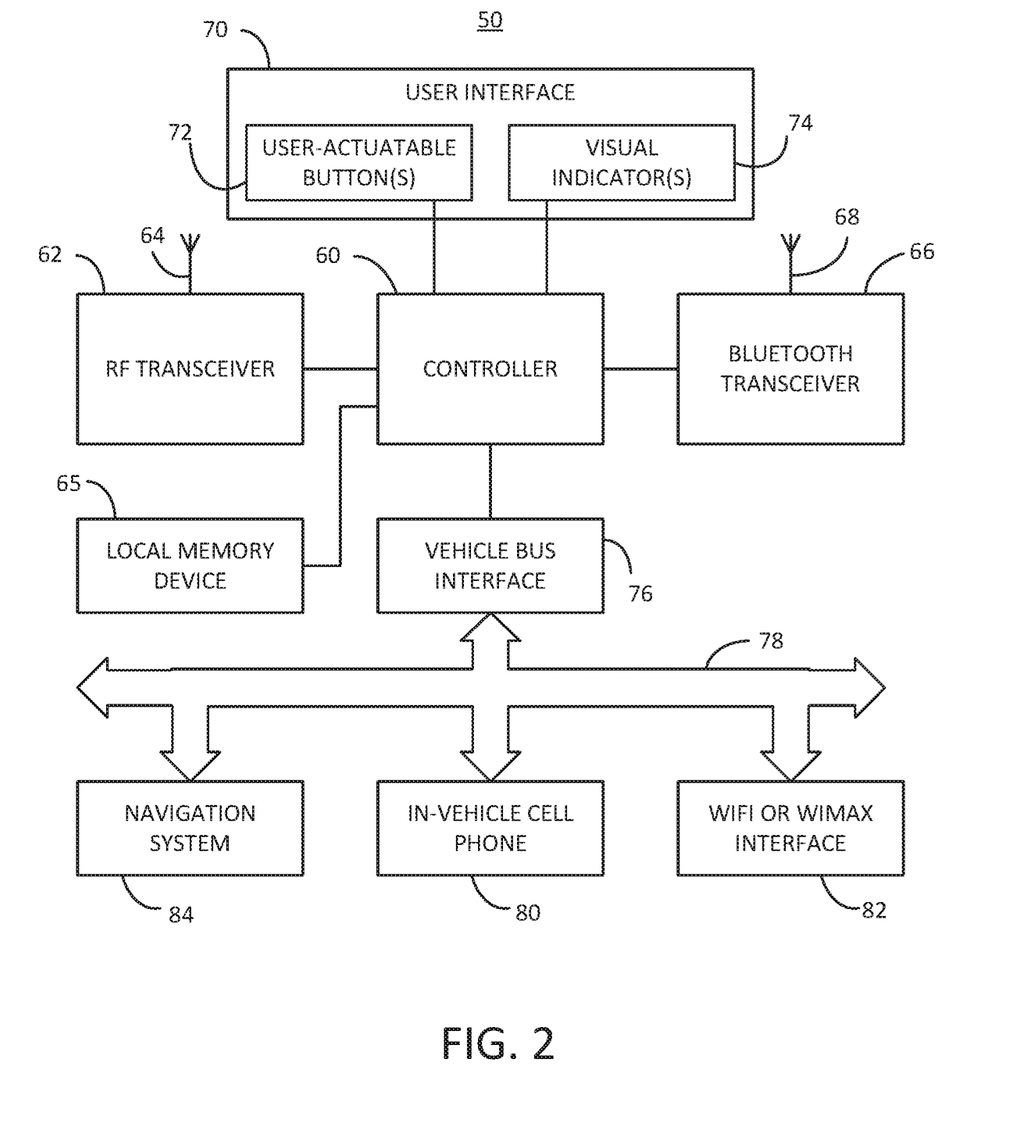
FIG. 2 is a block diagram showing a vehicle transceiver system operable in the environment of FIG. 1.

FIG. 2 shows an example of trainable transceiver 50 that may be used in the environment 10 (FIG. 1). As shown, trainable transceiver 50 may include a controller 60, an RF transceiver 62, a first antenna 64, a local memory device 65, an interface for connecting with an Internet-connected device 40 where the interface is shown in the form of a Bluetooth transceiver 66, a second antenna 68, a user interface 70 including at least one user-actuatable input 72 and at least one visual indicator 74, and a vehicle bus interface 76 connected to a vehicle bus 78. Although shown as separate components, RF transceiver 62 and Bluetooth transceiver 66 may be integrated or partially integrated to share components. Note that the same components shown in FIG. 2 may be used for second trainable transceiver 50a or any other trainable transceivers used in environment 10.

Controller 60 may be a microprocessor programmed to respond to inputs from various components to control RF transceiver 62 to receive and transmit signals using antenna 64 that may be received from or transmitted to a remote device 20. Such inputs may come from user interface 70, a remote device such as a mobile device 40 via Bluetooth transceiver 66, or from various other components connected to vehicle bus 78 via bus interface 76 such as navigation system 84, an in-vehicle cell phone 80, or a Wi-Fi or Wi-Max interface 82.

The construction of RF transceiver 62 and the control thereof by controller 60 are not described in detail herein with the exception of the modifications described below. Details may be found in U.S. Pat. Nos. 5,442,340; 5,479,155; 5,583,485; 5,614,891; 5,619,190; 5,627,529; 5,646,701; 5,661,804; 5,686,903; 5,699,054; 5,699,055; 5,793,300; 5,854,593; 5,903,226; 5,940,000; 6,091,343; 6,965,757; 6,978,126; 7,469,129; 7,786,843; 7,864,070; 7,889,050; 7,911,358; 7,970,446; 8,000,667; 8,049,595; 8,165,527; 8,174,357; 8,531,266; 8,494,449; 8,384,580; 8,264,333; and 8,253,528, the entire disclosures of which are incorporated herein by reference. Before discussing the modifications, an example is provided of one implementation of the trainable transceiver 50.

Figure 3:
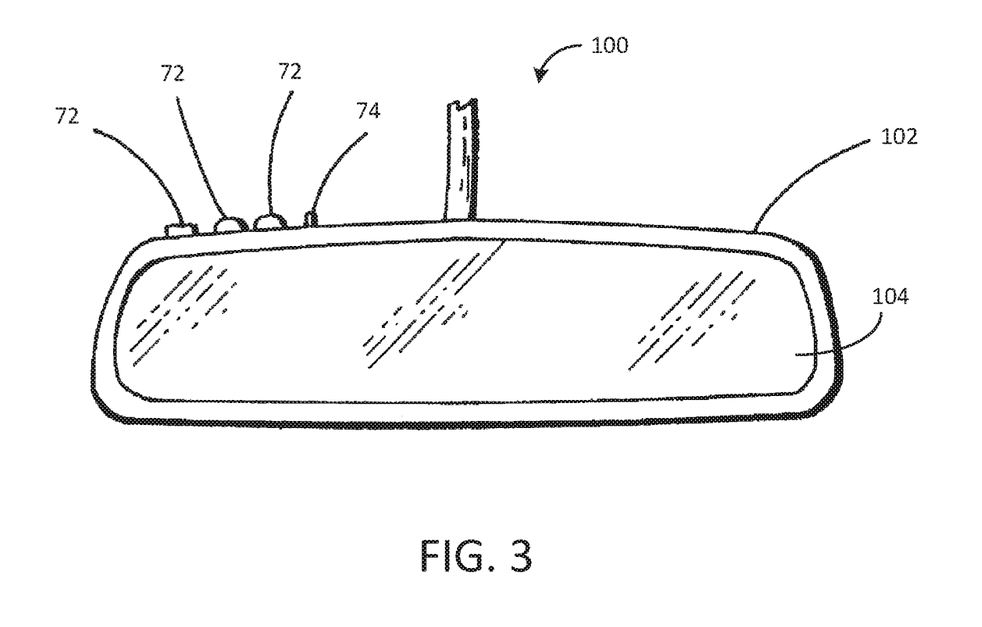
FIG. 3 is a perspective view of a rearview assembly incorporating the vehicle transceiver system of FIG. 2.

FIG. 3 shows an example of a vehicle accessory in the form of a rearview assembly 100 in which trainable transceiver 50 may be incorporated. Although shown in a rearview assembly 100, trainable transceiver 50 could be incorporated into various other vehicle accessories or locations within a vehicle. As shown in FIG. 3, rearview assembly 100 may include a housing 102 for mounting to the vehicle, and a rearview device 104 such as a rearview mirror element, a rearview display or both disposed in housing 102. Rearview assembly 100 may further include at least one user-actuated input 72, such as a push button, capacitive touch sensor, or optical sensor and at least one visual indicator 74 of user interface 70. Visual indicator(s) 74 may take the form of LED indicator lights or may be a display such as disclosed in U.S. Pat. No. 8,643,481, the entire disclosure of which is incorporated herein by reference. The remaining components of trainable transceiver 50 may be housed within housing 102 and are not shown in FIG. 3.

When provided in a rearview assembly 100 where rearview device 104 is an electro-optic mirror element, controller 60 may be configured to read outputs of light sensors (not shown) and control the reflectivity of the electro-optic mirror element. Further, controller 60 may be programmed to control any other components within rearview assembly 100 such as a display, map lights, a compass, an imager, and/or a headlamp control system. Controller 60 may further be programmed to control other vehicle accessories via vehicle bus 78.

Referring back to FIGS. 1 and 2, the ability to allow for transfer of channel data between local memory devices 65 of trainable transceivers 50 and 50a of different vehicles provides for several different use cases. The first pertains to a loaner vehicle where a customer brings their vehicle (having first trainable transceiver 50) to the dealership service and is provided with a loaner vehicle (having second trainable transceiver 50a). The channel data from the first trainable transceiver 50 of a customer's vehicle may be transferred to the second trainable transceiver 50a of the loaner vehicle so that the customer has a usable trainable transceiver 50a without having had to train it.

The second use case is where a customer purchases a new vehicle (having second trainable transceiver 50a). As part of the dealer preparation, the channel data in the first trainable transceiver 50 of a customer's vehicle may be transferred to the second trainable transceiver 50a of the new vehicle.

The third use case is where there are multiple users of a trainable transceiver 50 and different channel data may be loaded in trainable transceiver 50 depending on who is driving the vehicle. In this third use case, channel data is not necessarily transferred between trainable transceivers 50 and 50a of different vehicles, but rather user-specific channel data is downloaded from the cloud (remote memory device 34) depending on who is using the vehicle. Identification of the person using the vehicle may, for example, be made by transmission of a data signal from a remote keyless entry transmitter associated with a particular user.

A fourth use case is where two vehicles access the same garage that has a GDO (remote device 20) that responds to rolling codes. Because some rolling code GDOs maintain a rolling code counter that may be used to activate the GDO, it is possible that if one of the two vehicles is not using the garage for a period of time (as in the case of being away on travel), the trainable transceiver 50a of the second vehicle may no longer be generating rolling codes that have a rolling code counter that falls within a window of acceptance of the GDO. Accordingly, by configuring the system such that channel data including the rolling counter may be uploaded from trainable transceiver 50 to the cloud and subsequently downloaded from the cloud for use by trainable transceiver 50a, the most recently used rolling code counter may be updated to ensure that both trainable transceivers 50 and 50a are transmitting rolling code counters within the acceptance window of the GDO.

To implement the capability of channel data transfer between two trainable transceivers 50 and 50a, different types of channel data may need to be transferred depending upon the type of signal used to activate the remote device(s) 20. For example, the signal may have a fixed code or a rolling code. When a fixed code channel is copied to a second trainable transceiver 50a, that channel data is immediately usable by the second trainable transceiver 50a. There would be no need for the user to press the learn button (if there is one) on the GDO.

When a rolling code channel is transferred to a second trainable transceiver 50a, whether or not the user must press the learn button on the GDO depends on the type of rolling code system and what information is transferred. While not having to press the learn button is convenient, this method has its drawbacks. One drawback is that depending on the rolling code system, there may be security risks, as sensitive data such as encryption keys would have to be transferred to the second trainable transceiver 50a. Another drawback is that in use cases where the original trainable transceiver 50 will be used again (e.g., the loaner vehicle use case), the rolling code counter from the second trainable transceiver 50a should be transferred back to the original trainable transceiver 50 in order for it to become functional again. Otherwise the original trainable transceiver 50 would be non-functional until the counter "caught up" with the value in the GDO.

Regardless of whether the remote device 20 responds to a fixed or rolling code, certain channel header data will typically be stored in local memory device 65 and thus be subject to transfer. Such channel header data may include type, manufacturer, modulation, frequency, and first level. The channel header data may further include frequency deviation if the signal is frequency modulated. Signal characteristic data incorporated in the channel data may also include pulse timing and pulse sequence in the event a fixed code is used. Other signal characteristic data incorporated in the channel data may include serial number, rolling counter, function code, and any other data necessary to replicate the message.

One concern with the transfer of channel data is that sensitive data such as rolling code keys may have to be transferred between trainable transceivers 50 and 50a.

There are two sets of data that may be maintained by the trainable transceivers 50 and 50a. One is the trained channel data that is stored in non-volatile memory device 65, and the other is an RC Table that holds the serial numbers and keys to build various rolling code systems. A portion, if not all, of that data may be transferred in order to allow a second trainable transceiver 50a to activate the same devices as the first trainable transceiver 50. The specific data that is transferred depends on which type of system the first trainable transceiver 50 is trained, and whether or not the user should be required to press the learn button on the opener in order for the second trainable transceiver 50a to work.

The actual data transfer process could be accomplished by several different methods: (1) a dealership could perform the transfer using a custom device that is possibly Bluetooth-enabled; (2) transfer could be done by the end user with their phone (Internet-connected mobile device 40), again via Bluetooth, where the phone memory serves as the remote memory for storing the channel data; (3) transfer could be done via Internet 30 if the trainable transceivers 50 and 50a were connected to the Internet 30 either (a) through vehicle bus 78 and either an in-vehicle cell phone 80 or a Wi-Fi or Wi-Max interface 82 (or other means), or (b) through an interface (such as Bluetooth transceiver 66) and Internet-connected mobile device 40; or (4) the trainable transceivers 50 and 50a could communicate with each other directly using RF signals (such as Bluetooth signals).

The mobile device 40 implemented as a smartphone, may have an app that allows the user to copy the channel data from trainable transceiver 50 to their mobile device 40. The app would give the user the option of erasing the channel data from the original trainable transceiver 50, which would be preferred in the case where the user wishes to transfer channel data to a second trainable transceiver 50a of a new vehicle, or they can keep the original trainable transceiver 50 as is. Even if the transfer is only temporary, such as when using a loaner vehicle, the user may wish to temporarily erase the channel data from the original trainable transceiver 50 for security purposes. The app could even be used to lock out trainable transceiver 50 even when no transfer of data is taking place. This could be useful when valet parking or when leaving the vehicle unattended for an extended period of time, for example, at the airport. The user would then take their mobile device 40 to the new vehicle and transfer one or more channels of data to the trainable transceiver 50a of the new vehicle. The app could also be used to move data between channels on a single trainable transceiver 50 such that one may switch between different buttons 72 that may be used to transmit a signal to a particular remote device 20.

In the event that channel data is stored on remote memory device 34, additional security measures may be desired. For example, when registering a user for this particular web service, the server 32 may require entry of the telephone number of the mobile device 40. The server 32 may then cause a text message to be sent to the mobile device 40 while requiring an acknowledgement text in return so as to exchange tokens that are subsequently used to prevent hacking into the server 32. Various known measures such as those used by the banking industry may be used to ensure only authorized users may access the data stored in remote memory device 34.

Although the trainable transceivers 50 and 50a are described as being integrated into respective vehicles, they may be handheld devices that may or may not be associated with any particular vehicle. Further, although the embodiments above have described the data to be transferred as channel data, other forms of data that are not tied to a particular channel may be transferred.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A trainable transceiver for transmitting signals to a remote device, the trainable transceiver comprising:
    an RF transceiver configured to receive an RF signal during a training mode in order to learn characteristics of the received RF signal, and to transmit an RF signal to the remote device in an operating mode where the transmitted RF signal includes the learned characteristics of the received RF signal;
    a local memory device for storing channel data representing the learned characteristics of the received RF signal;
    an interface configured to communicate with an Internet-connected device; and
    a controller coupled to the local memory device and the interface, the controller configured to retrieve the channel data from the local memory device and to transfer the channel data for remote storage in a memory device remotely located from the trainable transceiver using the interface and the Internet-connected device,
    wherein the channel data is in a form that may be downloaded though the Internet to another trainable transceiver that can then replicate the received RF signal without having to receive the RF signal and learn the characteristics of the RF signal,
        wherein the channel data includes a rolling counter of a garage door opener that responds to rolling codes.

2. The trainable transceiver of claim 1, wherein the learned characteristics of the received RF signal include channel header data and at least one of the following: pulse timing, pulse sequence, a serial number, a rolling counter, and a function code.

3. The trainable transceiver of claim 2, wherein the channel header data includes type, manufacturer, modulation, and frequency.

4. The trainable transceiver of claim 3, wherein the channel header data includes frequency deviation.

5. The trainable transceiver of claim 1, wherein the Internet-connected device is a mobile Internet-connected device and wherein the channel data is transferred from the local memory device to the mobile Internet-connected device.

6. The trainable transceiver of claim 5, wherein the mobile Internet-connected device transfers the channel data to the remote memory device, which is accessible on the Internet.

7. The trainable transceiver of claim 5, wherein the mobile Internet-connected device transfers the channel data to a second trainable transceiver.

8. The trainable transceiver of claim 1, wherein the interface is a second transceiver for wirelessly communicating with the Internet-connected device.

9. The trainable transceiver of claim 8, wherein the second transceiver is a Bluetooth transceiver.

10. The trainable transceiver of claim 1, wherein the interface is a vehicle bus interface coupled to a vehicle bus, and wherein the Internet-connected device is connected to the vehicle bus.

11. The trainable transceiver of claim 1, wherein the Internet-connected device is one of a smartphone, a tablet, and a laptop, and wherein the remote storage is in the memory of the Internet-connected device.

12. The trainable transceiver of claim 1 further comprising a user interface coupled to the controller, wherein the user interface is integrated into a rearview assembly of a vehicle.

13. A trainable transceiver for transmitting signals to a remote device, the trainable transceiver comprising:
    a local memory device;
    an interface configured to communicate with an Internet-connected device capable of storing channel data in a remote memory device that is remote from the trainable transceiver, the channel data representing characteristics of an RF signal;
    a controller coupled to the local memory device and the interface, the controller configured to receive channel data from the remote memory device through the Internet using the interface and the Internet-connected device and to store the received channel data in the local memory device; and
    an RF transceiver configured to transmit the RF signal to the remote device in an operating mode where the transmitted RF signal includes the characteristics stored as channel data in the local memory device and where the RF transceiver transmits the RF signal without having to first receive the RF signal and learn the characteristics of the RF signal,
    wherein the channel data includes a rolling counter of a garage door opener that responds to rolling codes.

14. The trainable transceiver of claim 13, wherein the RF transceiver is configured to receive an RF signal during a training mode in order to learn characteristics of the received RF signal, and wherein the controller stores the learned characteristics of the received RF signal as channel data in the local memory device.

15. The trainable transceiver of claim 14, wherein the controller is further configured to retrieve the learned characteristics of the received RF signal from the local memory device and to transmit the learned characteristics of the received RF signal for storage in the remote memory device using the interface.

16. The trainable transceiver of claim 13 and further comprising a user interface coupled to the controller, wherein the user interface is integrated into a rearview assembly of a vehicle.

17. The trainable transceiver of claim 13, wherein the characteristics of the RF signal include channel header data and at least one of the following: pulse timing, pulse sequence, a serial number, a rolling counter, and a function code.

18. The trainable transceiver of claim 17, wherein the channel header data includes type, manufacturer, modulation, and frequency.

19. The trainable transceiver of claim 18, wherein the channel header data includes frequency deviation.

20. The trainable transceiver of claim 13, wherein the Internet-connected device is a mobile Internet-connected device and wherein the channel data is transferred from the remote memory device to the mobile Internet-connected device prior to transfer to the local memory device.

21. The trainable transceiver of claim 20, wherein the remote memory device is accessible on the Internet.

22. The trainable transceiver of claim 13, wherein the interface is a second transceiver for wirelessly communicating with the Internet-connected device.

23. The trainable transceiver of claim 22, wherein the second transceiver is a Bluetooth transceiver.

24. The trainable transceiver of claim 13, wherein the interface is a vehicle bus interface coupled to a vehicle bus, and wherein the Internet-connected device is connected to the vehicle bus.

25. The trainable transceiver of claim 13, wherein the Internet-connected device is one of a smartphone, a tablet, and a laptop, and wherein the remote memory device is a memory device of the Internet-connected device.

26. A method of transferring channel data from a first vehicle to a second vehicle,
where the channel data represents characteristics of an RF signal used to control a remote device, the method comprising:
providing a first trainable transceiver in the first vehicle and a second trainable transceiver in the second vehicle, each of the first and second trainable transceivers transmit RF signals to a remote device, and each trainable transceiver comprises:
a local memory device,
a controller coupled to the local memory device, the controller configured to store channel data in the local memory device, and
an RF transceiver configured to transmit the RF signal to the remote device in an operating mode where the transmitted RF signal includes the characteristics stored as channel data in the local memory device;
reading channel data from the local memory device of the first trainable transceiver; and
storing the channel data that is read from the local memory device of the first trainable transceiver in the local memory device of the second transceiver such that the second trainable transceiver may replicate the RF signal without having to receive the RF signal and learn characteristics of the RF signal,
wherein the channel data includes a rolling counter of a garage door opener that responds to rolling codes.

27. The method of claim 26, wherein:
the step of reading the channel data comprises inputting a command to the controller of the first trainable transceiver to cause the controller to read the channel data from the local memory of the first trainable transceiver and to transfer the channel data to an intermediary memory device, and
the step of storing the channel data in the local memory device of the second trainable transceiver comprises inputting a command to the controller of the second trainable transceiver to cause the controller to read the channel data from the intermediary memory device and to store the channel data in the local memory device of the second trainable transceiver.

28. The method of claim 27, wherein the intermediary memory device is that of a smartphone having a Bluetooth transceiver, and wherein each of the first and second trainable transceivers includes a Bluetooth transceiver paired with the Bluetooth transceiver of the smartphone.

29. The method of claim 26, wherein each of the first and second trainable transceivers includes an interface configured to communicate with the interface of the other of the first and second trainable transceiver,
wherein the step of reading the channel data comprises inputting a command to the controller of the first trainable transceiver to cause the controller to read the channel data from the local memory of the first trainable transceiver and to transfer the channel data through the interface to the controller of the second trainable transceiver,
wherein the step of storing the channel data in the local memory device of the second trainable transceiver comprises inputting a command to the controller of the second trainable transceiver to cause the controller to receive the channel data through the interface that is transferred from the controller of the first trainable transceiver and to store the channel data in the local memory device of the second trainable transceiver.

30. The method of claim 29, wherein the interface of each of the first and second trainable transceivers is a second RF transceiver for wirelessly communicating with an Internet-connected device.

31. The trainable transceiver of claim 30, wherein the second RF transceiver is a Bluetooth transceiver, and wherein the Bluetooth transceivers of each of the first and second trainable transceivers are paired with one another.

\* \* \* \* \*